US008631278B2

(12) United States Patent
Gale et al.

(10) Patent No.: US 8,631,278 B2
(45) Date of Patent: Jan. 14, 2014

(54) DIAGNOSTICS FOR REMOTE COMPUTER SYSTEMS

(75) Inventors: Martin J. Gale, Eastleigh (GB); Alexander Craig Filshie Russell, Ipswich (GB); Graham White, Alton (GB)

(73) Assignee: International Business Machines Corporation, Armonk, NY (US)

( * ) Notice: Subject to any disclaimer, the term of this patent is extended or adjusted under 35 U.S.C. 154(b) by 1923 days.

(21) Appl. No.: 11/306,128

(22) Filed: Dec. 16, 2005

(65) Prior Publication Data

US 2007/0245174 A1    Oct. 18, 2007

(30) Foreign Application Priority Data

Dec. 21, 2004  (GB) .................................. 0427942.8

(51) Int. Cl.
*G06F 11/00* (2006.01)
(52) U.S. Cl.
USPC .......................................................... 714/26
(58) Field of Classification Search
USPC ............................................... 714/27, 25, 26
See application file for complete search history.

(56) References Cited

U.S. PATENT DOCUMENTS

| 4,757,463 | A | * | 7/1988 | Ballou et al. ................. 701/33.6 |
| 5,021,997 | A | * | 6/1991 | Archie et al. .................... 714/31 |
| 5,794,237 | A | * | 8/1998 | Gore, Jr. ........................ 707/688 |
| 5,983,364 | A | * | 11/1999 | Bortcosh et al. ................ 714/25 |
| 6,260,160 | B1 | * | 7/2001 | Beyda et al. ..................... 714/27 |
| 6,557,115 | B2 | * | 4/2003 | Gillenwater et al. ........... 714/25 |
| 6,681,344 | B1 | * | 1/2004 | Andrew ..................... 714/38.14 |
| 6,775,824 | B1 | * | 8/2004 | Osborne et al. ............... 717/125 |
| 7,206,833 | B1 | * | 4/2007 | Sarangam et al. ............ 709/224 |
| 7,318,171 | B2 | * | 1/2008 | Rothman et al. ................ 714/25 |
| 2004/0153823 | A1 | * | 8/2004 | Ansari ............................ 714/38 |

* cited by examiner

*Primary Examiner* — Yair Leibovich
(74) *Attorney, Agent, or Firm* — Steven L. Nichols; Van Cott, Bagley, Cornwall & McCarthy P.C.

(57) ABSTRACT

A system for use in an environment having a remote computer system, a user associated with the remote computer system, and an error detection component for detecting errors associated with the remote computer system comprises a storage component for computer programs that performing diagnostics errors associated with the remote computer system, and a search component, responsive to a first error being detected, for searching the storage component for a first computer program associated with the first error. If a first computer program is found, a presentation component presents a first option to the user, wherein the first option is associated with selection of the first computer program. If the user selects the first computer program, an execution component executes the first computer program on the remote computer system.

19 Claims, 5 Drawing Sheets

| MACHINE ID | SERVICE ID | ERROR CODE | PROGRAM | ADMINISTRATOR ID | TIMESTAMP |
|---|---|---|---|---|---|
| 1.2.3.4 | http_protocol | 404 | http404.sh | Admin1@mail.com<br>Admin2@instant_message.com<br>Admin3@mobilephone.com | 2003-11-28 15:49:23 |

FIG. 5

| ADMINISTRATOR ID | STATUS |
|---|---|
| Admin1@mail.com | Available |
| Admin2@instant_message.com | Available |
| Admin3@mobilephone.com | Away |

FIG. 6

DIAGNOSTICS FOR REMOTE COMPUTER SYSTEMS

FIELD OF THE INVENTION

The present invention relates to a diagnostic system suitable for use in an environment having a remote computer system and an error detection component for detecting errors associated with the remote computer system.

BACKGROUND OF THE INVENTION

System administration tools are well known; they typically alert an administrator upon detecting a problem in a system. However, current tools have some shortcomings. For example, when a fault can be very easily fixed (e.g. by restarting a process), alerting an administrator to come out and apply a fix can be a waste of the administrator's time. Furthermore, alerting the most appropriate administrator (e.g., an administrator that can best deal with a particular fault) is difficult, and alerting an administrator who is unfamiliar with a fault can result in a longer period of time before a fix is applied, and, in the worst case, result in even more faults with the system.

Furthermore, a system administrator has hands-on knowledge that can be specialized, especially if the system has a non-standard configuration, which knowledge is not easy to transfer to others. One solution to this problem is the creation of a knowledge base that stores details of faults and associated fixes. Some tools also allow a user to broadcast a message containing details of a problem to a community, so that members of the community can respond to the user with suggested fixes.

However, both of these solutions are typically directed towards common faults rather than complex faults on specialized systems (e.g. servers that have been configured in a certain way). Furthermore, a knowledge base can become outdated, and the quality of the information in it can vary depending on how it is captured (e.g. how often it is captured, how it is recorded in the knowledge base, and the like).

The currently available system administration tools for monitoring machines fall into two categories, namely, host based tools and remotely based tools. With a host based tool, program code that performs monitoring, altering, and the like must be installed onto all host machines. Installation can be difficult if there are several host machines. Moreover, host-based monitors rely on a solid installation of the code; consequently, if the machine becomes corrupted in some way, the monitor can be damaged. Typically, the program code is also difficult to port, because program code that has been written to perform functions in one environment will often not function reliably in other environments.

Remote based tools are advantageous in that they need not be installed locally at each host machine and can be run remotely at a separate server. However, these tools simply report faults, details of which are then displayed on a screen. To view the details, an administrator must be present at the screen.

SUMMARY

According to a first aspect, there is provided a system for use in an environment having: a remote computer system, a user associated with the remote computer system, and an error detection component for detecting one or more errors associated with the remote computer system, said system comprising: a storage component for storing one or more computer programs for performing diagnostics on one or more errors associated with the remote computer system; a search component, responsive to a first error being detected, for searching the storage component for a first computer program associated with the first error; a presentation component for presenting a first option to the user, wherein the first option is associated with selection of the first computer program; and an execution component, responsive to receiving a first input from the user associated with a selection of the first computer program, for executing the first computer program on the remote computer system.

Preferably, the system further comprises a message broker, wherein the user subscribes with the message broker. Advantageously, the use of a publish/subscribe system allows the present invention to support a plurality of heterogeneous devices associated with users, and thus, a user can be contacted at any time and need not be present at a display screen associated with the remote computer system.

Preferably, the user is of a sub-set of a set of users, wherein the sub-set is associated with the first computer program (e.g. a sub-set of users who created the first computer program). Preferably, the storage component stores computer program data associated with the one or more computer programs (e.g. a timestamp); error data associated with the one or more errors (e.g. an error identifier, a component associated with the error (e.g. a machine, a service, a process etc.)); and status data associated with availability of the user. Advantageously, the storage component stores data about a particular error associated with a particular component and thus, provides more a knowledge base of specialized data.

In a preferred embodiment, a checking component checks the status data in order to determine whether the user is available. In response to the checking component determining that the user is available, the presentation component presents the first option to the user. Thus, advantageously, only available users are contacted by the presentation component.

In one embodiment, the presentation component presents the first option to a plurality of users of the set. In response to a plurality of inputs from the plurality of users, a selection component selects the first input (e.g. by checking timestamps of the inputs). Preferably, the system further comprises an authentication component for authenticating the user before the execution component executes the first computer program.

Preferably, the error detection component determines whether the first computer program has successfully performed diagnostics on the first error. In one embodiment, in response to the first computer program unsuccessfully performing diagnostics on the first error, the execution component re-executes the first computer program. In another embodiment, response to the first computer program unsuccessfully performing diagnostics on the first error, the presentation component presents the first option to the plurality of users.

In yet another embodiment, in response to the first computer program unsuccessfully performing diagnostics on the first error, the presentation component presents a second option to the user, wherein the second option is associated with selection of command transmission. This second option allows a user to attempt to fix an error themselves (i.e. without use of a stored computer program. Preferably, wherein in response to a second input associated with a de-selection of the first computer program, the presentation component presents a second option to the user, wherein the second option is associated with selection of command transmission. Preferably, in response to receiving a third input associated with a selection of command transmission, the execution component receives a first command transmitted by the user. Preferably, the execution component transmits the first command to the remote computer system. Preferably, the execution component stores the first command as a second computer program in the storage component.

According to a second aspect, there is provided a method for use in an environment having: a remote computer system, a user associated with the remote computer system, and an error detection component for detecting one or more errors associated with the remote computer system, said method comprising: storing one or more computer programs for performing diagnostics on one or more errors associated with the remote computer system; in response to a first error being detected, searching the storage component for a first computer program associated with the first error; presenting a first option to the user, wherein the first option is associated with selection of the first computer program; and in response to receiving a first input from the user associated with a selection of the first computer program, executing the first computer program on the remote computer system.

According to a third aspect, there is provided a computer program comprising program code means adapted to perform the method above, when the program is run on a computer.

BRIEF DESCRIPTION OF THE DRAWINGS

The present invention will now be described, by way of example only, with reference to preferred embodiments thereof, as illustrated in the following drawings, wherein.

DETAILED DESCRIPTION

Figure 1:
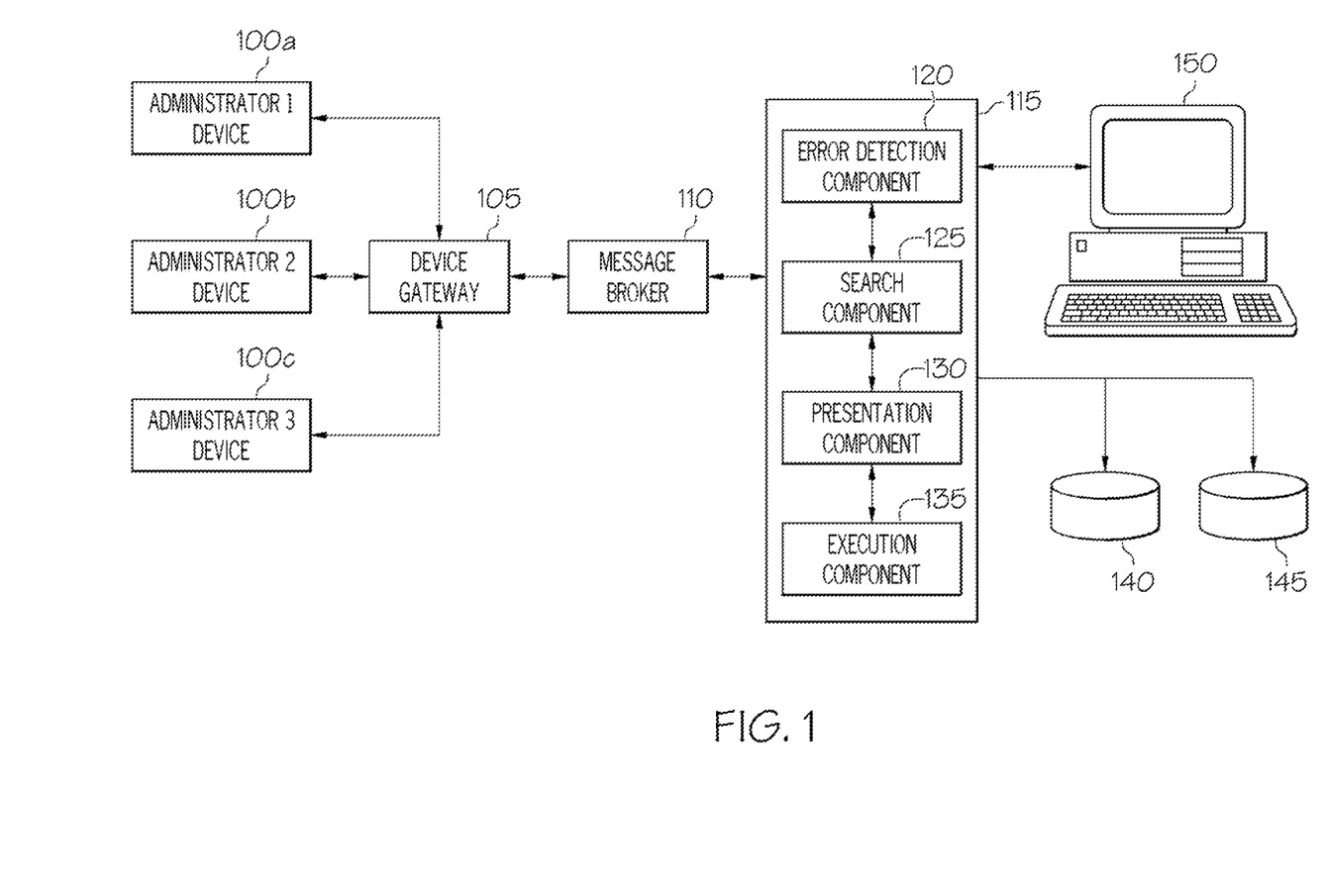
FIG. 1 shows a schematic drawing of a system in which the present invention may be implemented.

The present invention will now be described with reference to the FIGs. Referring to FIG. 1, there is shown a system (100) in which the present invention may be implemented, wherein one or more administrators (e.g. Administrator 1, Administrator 2, Administrator 3 Administrators n) administer one or more first computer systems (150). Each administrator has an associated device (i.e. Administrator 1 device, Administrator 2 device, Administrator 3 device). The first computer system (150) is remotely located to the administrator devices and is preferably a HTTP server.

The system (100) also comprises an error detection component (120) for monitoring the first computer system (150) for one or more errors, a search component (125) for searching one or more storage components, a presentation component (130) for presenting information to an administrator and an execution component (135) for executing a program code component on the first computer system (150).

In this embodiment, the error detection component (120), the search component (125), the presentation component (130) and the execution component (135) are located on a second computer system (115). Alternatively, the components (120, 125, 130 and 135) can be located on the first computer system (150).

The system also supports a publish/subscribe system wherein a broker (110) associates publishers (e.g. the presentation component (130) and the execution component (135)) with subscribers (i.e. Administrator 1 Device, Administrator 2 Device, Administrator 3 Device), via a device gateway (105).

Each administrator subscribes with the broker (110), which stores data associated with the administrators (e.g. network address) in a subscriber list. Advantageously, the use of a publish/subscribe (pub/sub) system supports heterogeneous subscriber devices (e.g. a mobile phone, a personal computer etc.).

The system comprises a device gateway (105), which is an application program that converts messages from the broker (110) into a format that is supported by a particular device. For example, if Administrator 3 Device is a mobile phone, the device gateway (105) converts a message from the broker (110) into an SMS (Short Message Service) message.

Figure 5:
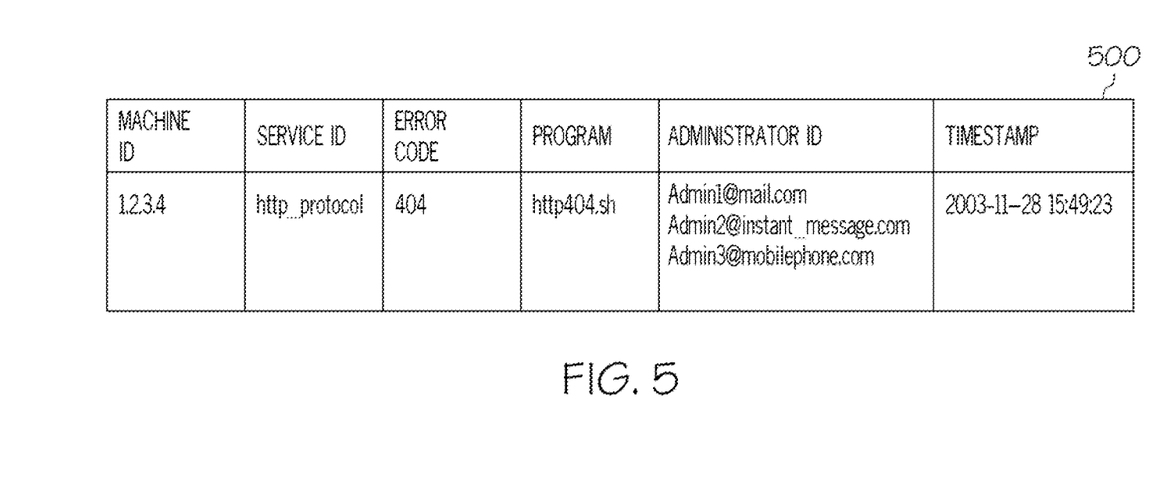
FIG. 5 is a representation of an entry from a knowledge base.

The system (100) also comprises a knowledge base (140) (that is, a storage component), wherein an example of an entry 500 of the knowledge base is shown in FIG. 5. Preferably, the knowledge base (140) stores data associated with the first computer system (150) being monitored. In the example of FIG. 5, a unique address (i.e. 1.2.3.4) associated with the first computer system (150) is stored in a field (i.e. Machine ID).

Preferably, the knowledge base (140) stores data associated with one or more services, processes, etc. of the first computer system (150) being monitored. In the example of FIG. 5, a unique identifier (i.e. http_protocol) associated with a process of the first computer system (150) is stored in a field (i.e. Service ID). Http is a protocol that is used to access information on the World Wide Web. Preferably, the knowledge base (140) stores data associated with an error code of the one or more services, processes, etc. of the first computer system (150) being monitored. In the example of FIG. 5, an error code (i.e. 404) associated with the http protocol is stored in a field (i.e. Error code).

Preferably, the knowledge base (140) stores a first program code component that has been used to fix an error associated with the protocol. In the example of FIG. 5, the first program code component (i.e. http404.sh) is stored in a field (i.e. Program).

Preferably, the knowledge base (140) stores data associated with an administrator (e.g. an administrator who created the program code component, an administrator who administered the program code component, etc.). In the example of FIG. 5, an e-mail address (i.e. admin1@email.com) associated with Administrator 1, an instant message address (i.e. admin2@instant message.com) associated with Administrator 2, and a mobile phone e-mail address (i.e. admin3@mobile_phone.com) associated with Administrator 3, are stored in a field (i.e. Administrator ID). Preferably, the knowledge base (140) stores data associated with a timestamp denoting a time at which the first program code component was logged in the knowledge base (140). In the example of FIG. 5, a timestamp (i.e. 2003 Nov. 28 15:49:23) is stored in a field (i.e. Timestamp).

Preferably, knowledge base entries are created by commands gathered from administrators by the execution component (135), as will be described later.

Figure 6:
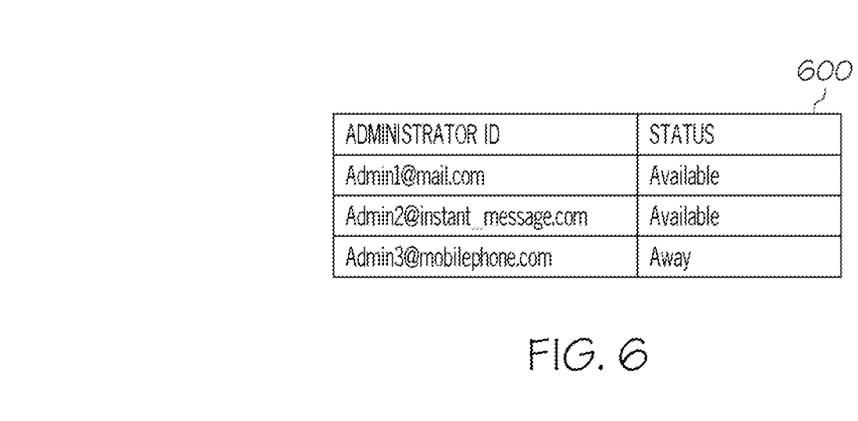
FIG. 6 is a representation of an entry from a status table.

The system (100) also comprises a status table (145) (that is, a storage component), wherein an example of an entry 600 of the status table is shown in FIG. 6. Preferably, the status table (145) stores data associated with an administrator and their status, wherein the status denotes whether or not the administrator can be contacted. In the example of FIG. 6, the status of a plurality of administrators (i.e. Available, Available, and Away associated with Administrator 1, Administrator 2, and Administrator 3, respectively) is stored in fields (i.e. Status and Administrator ID, respectively). In one embodiment, data associated with status is entered into the status table (145) manually. In another embodiment, data associated with status is derived. In one example, if the ID associated with Administrator 2 is an address associated with an instant messaging application, a call to the instant messaging application is made, to determine whether Administrator 2 is online, that is, whether Administrator 2 has an active session with the instant messaging application. It should be understood that alternatively, the knowledge base (140) and the status table (145) can be held in one storage component.

Figure 2:
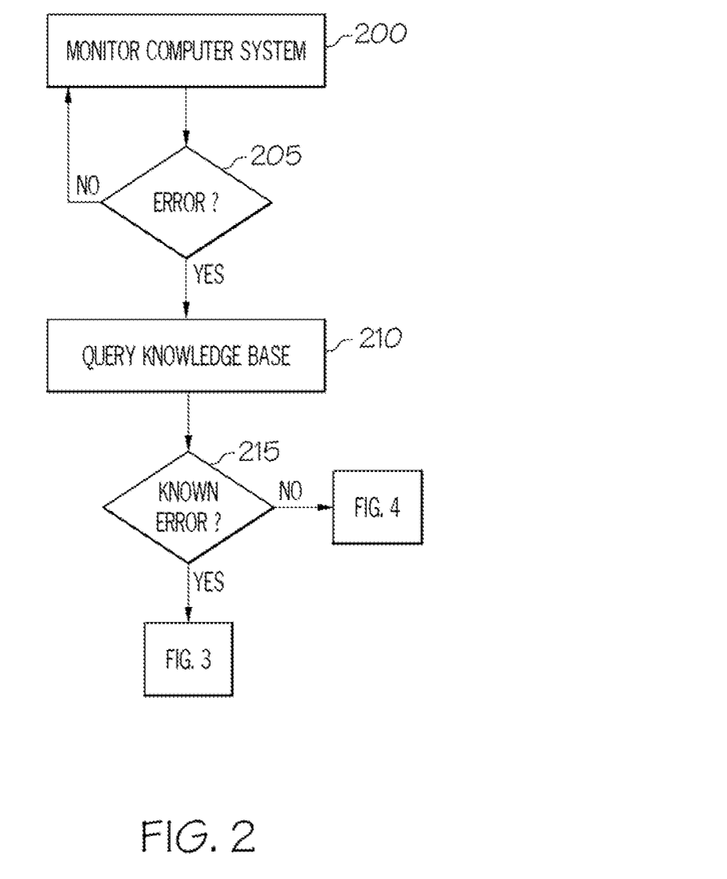
FIG. 2 is a flow chart showing the operational steps involved in a search process.

A preferred embodiment will now be described with reference to FIGS. 2-4. With reference to step 200, the error detection component (120) monitors one or more components (e.g. a service, a process, etc.) on the first computer system (150). In this embodiment, the error detection component (120) is an application program comprising one or more threads (i.e. processes). In this embodiment, a thread monitors a particular service, process etc. on a single first computer system (150). Alternatively, a thread monitors a particular service, process etc. on more than one computer system.

In this embodiment the error detection component (120) has a thread, which monitors a protocol (i.e. http_protocol). The thread periodically tries to connect to a port on the first computer system (150) (i.e. a HTTP server) and performs a get request (that is, a request that gets the index of a web site).

Next, at step 205, a determination as to whether an error has occurred is made by the error detection component (120). If an error has not occurred (i.e. the index page returns successfully) the error detection component (120) continues to monitor for errors until the error detection component (120) is stopped (e.g. by an administrator).

If an error has occurred, the process passes to step 210. In this embodiment, a 404 error code is returned. HTTP error code 404 is a known error and indicates that the request cannot be serviced. Next, the process passes to step 215, wherein the search component (125) searches the knowledge base (140) in order to determine (step 215) whether an entry associated with the error is present in the knowledge base (140).

Figure 3:
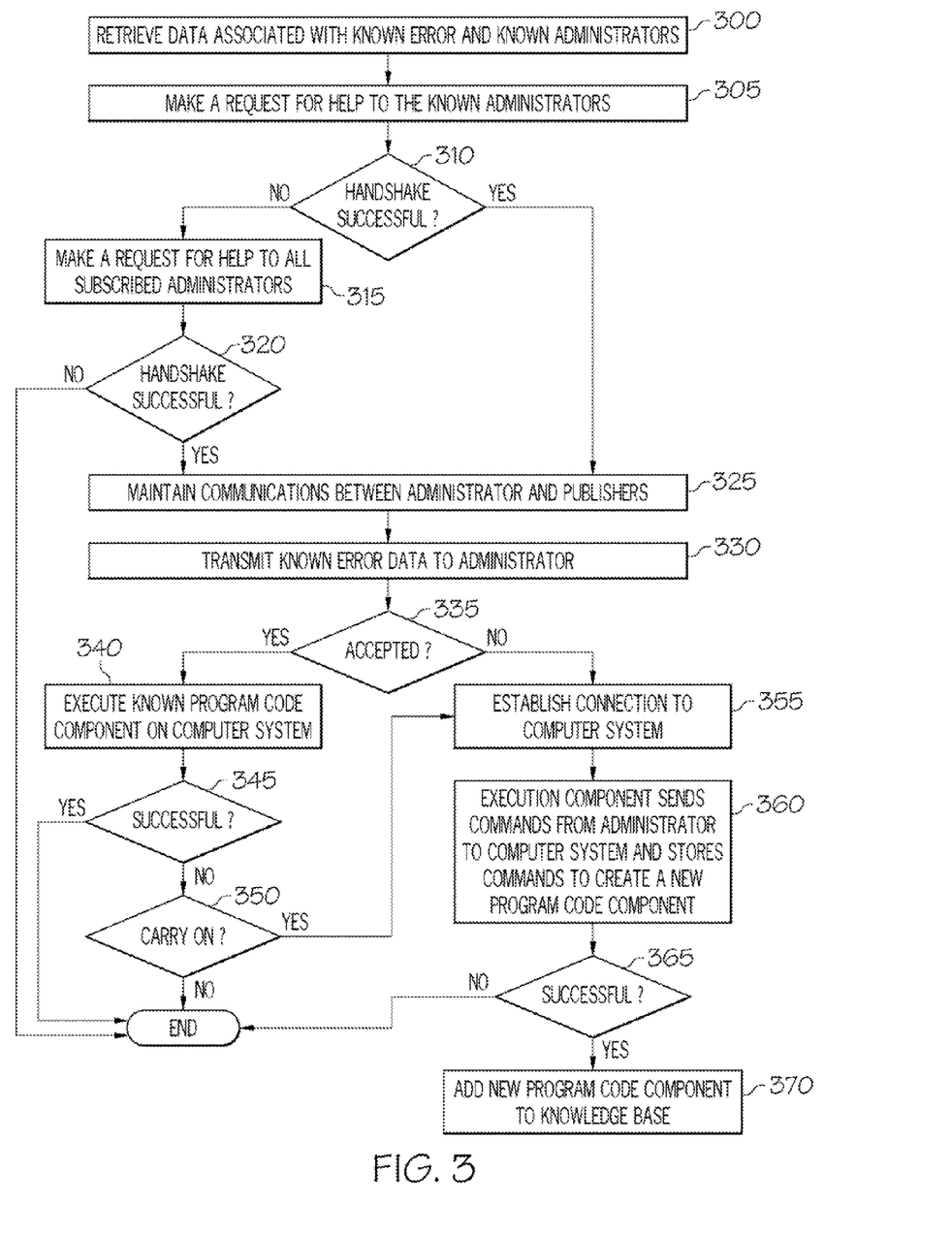
FIG. 3 is a flow chart showing operational aspects of a process executed when a known error is found.
Figure 4:
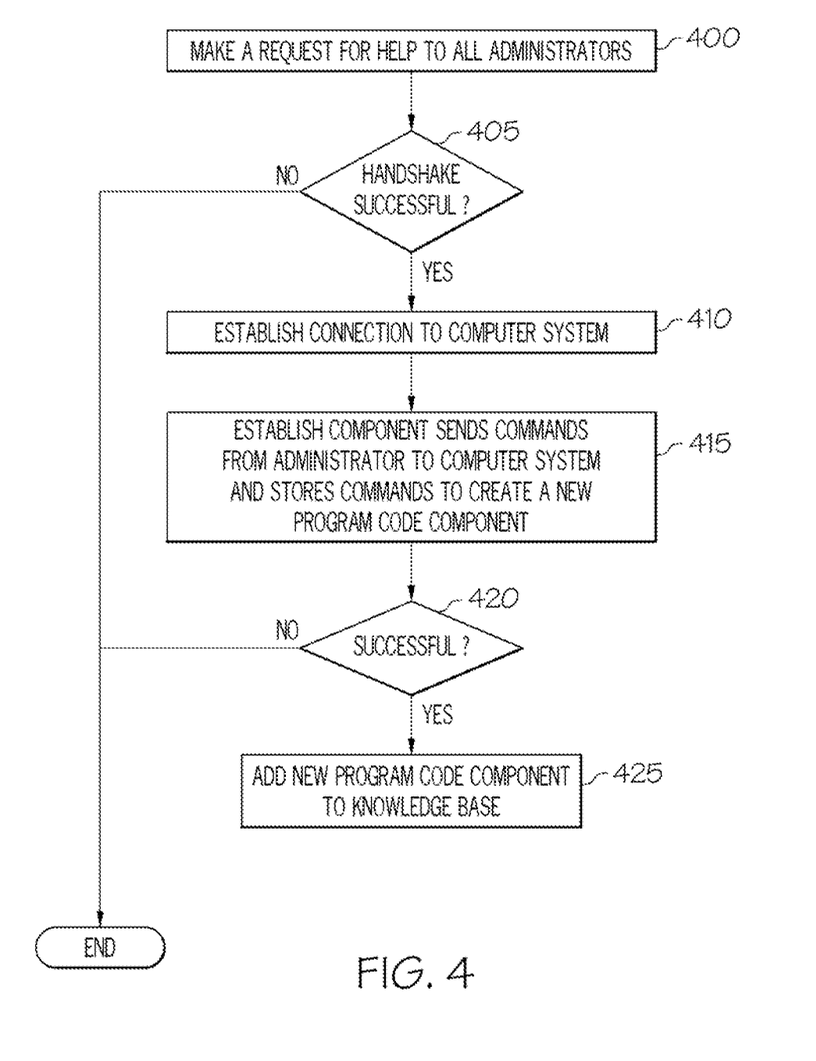
FIG. 4 is a flow chart showing operational aspects of a process executed when a known error is not found.

If an entry is present (and therefore, this means that the error is known) (positive result to step 215), the process passes to FIG. 3. In this embodiment, with reference to FIG. 5, an entry is present, and therefore the process passes to FIG. 3, which will now be described. At step 300, the search component (125) retrieves the entry associated with the error from the knowledge base (140). Preferably, before the process passes to step 305, a check component reads the Administrator ID field and uses the data, (i.e. admin1@email.com, admin2@instant message.com, and admin3@email.com) to search and check the status table (145) for a status associated with Administrator 1, Administrator 2, and Administrator 3, respectively.

If in response to a status check, it is determined that no administrators are available, the process passes to step 315, which will be described later. If one or more administrators are available, the process passes to step 305. With reference to FIG. 6, the check component finds that Administrator 1 and Administrator 2 are available and that Administrator 3 is not available. Alternatively, the process passes directly to step 305.

At step 305, the presentation component (130) publishes a first message, wherein the first message is a request for help. Specifically, a subscriber (i.e. an administrator) subscribes to a topic in the broker (110). In this embodiment, each administrator subscribes to a unique root topic, examples of which are shown below, wherein "#" represents a wildcard, which allows a subscriber to receive messages under any topic starting with the string "/administrators/administrator—1/request/":

| Topics 1: |
|---|
| /administrators/administrator_1/request/# |
| /administrators/administrator_2/request/# |
| /administrators/administrator_3/request/# |

Preferably, the presentation component (130) publishes to a sub-topic within a topic tree originating at the root topic, wherein the sub-topic is associated with available administrators (i.e. Administrator 1 and Administrator 2). Advantageously, a request for help is made only to available administrators. The sub-topics denote a unique identifier (i.e. x.y.z) for communications associated with a particular error. The sub-topics are shown below:

| Topics 1A: |
|---|
| /administrators/administrator_1/request/x.y.z |
| /administrators/administrator_2/request/x.y.z |

An example of the first message is shown below. Preferably, the first message comprises data associated with the error. In this example, the data is associated with the first computer system (150), the process having an associated error and the error itself, wherein the data is passed to the presentation component (130) by the search component (125) from the knowledge base (140):

Message 1 to sub-topic administrators/administrator_1/request/x.y.z and to sub-topic "/administrators/administrator_2/request/x.y.z":
<problem>
    <machineID>1.2.3.4</machineID>
    <serviceID>http_protocol</serviceID>
    <errorcode>404</errorcode>
</problem>

Next a handshake process is executed, wherein firstly, the presentation component (130) waits to see whether one or more responses to the first message are posted, wherein a response is an acceptance or declination of the request for help. Preferably, the presentation component (130) waits for an arbitrary time period. Specifically, the presentation component (130) subscribes to the sub-topics associated with available administrators, that is, Topics 1A above. If one or more responses to the first message are not posted, the process passes to step 315, which will be described later.

One or more administrators can respond to the first message by publishing one or more messages to the sub-topic. Second and third messages from Administrator 1 and Administrator 2 are posted to their associated sub-topics as shown below:

```
Message 2 to sub-topic "/administrators/administrator_1/request/x.y.z":
<response_1>
    <administratorID>Admin1@email.com</administratorID>
    <administrator_response>ACCEPT</administrator_response>
    <time>16:04:38</time>
</response_1>
Message 3 to sub-topic "/administrators/administrator_2/request/x.y.z":
<response_1>
    <administratorID>Admin2@instant_message.com</administratorID>
    <administrator_response>ACCEPT</administrator_response>
    <time>17:35:24</time>
</response_1>
```

Next, the administrators wait for a response from the presentation component (130) to the second and third messages. Preferably, each response from the presentation component (130) is an acceptance or declination of a message from an administrator.

If there is a plurality of responses from administrators, a selection component associated with the presentation component (130) selects a response from the plurality of responses. In one embodiment, the selection component selects a message from the first administrator to post a message (i.e. a message with the earliest timestamp). In another embodiment, the selection component waits for all messages to arrive and then selects a message from an administrator in a random manner. In this embodiment, the selection component selects a message from the first administrator to post a message. With reference to the second and third messages above, the second message from Administrator 1 has an earlier timestamp than the third message from Administrator 2 and thus, the selection component selects the second message from Administrator 1. In response to a message being selection, the presentation component (130) publishes fourth and fifth messages to the sub-topics associated with available administrators as shown below:

```
Message 4 to sub-topic "/administrators/administrator_1/request/x.y.z":
<response_2>
    <administratorID>Admin1@email.com</administratorID>
    <monitor_component_re-
    sponse>ACCEPT</monitor_component_response>
</response_2>
Message 5 to sub-topic "/administrators/administrator_2/request/x.y.z":
<response_2>
    <administratorID> Admin2@instant_message.com</administratorID>
    <monitor_component_re-
    sponse>DECLINE</monitor_component_response>
</response_2>
```

With reference to step 310, a determination is made as to whether the handshake process with an available administrator (i.e. Administrator 1) has been successful. In this embodiment, the handshake process has been successful. Now, the remaining administrators (i.e. Administrator 2) stop their subscriptions to their associated sub-topic, by sending a message to the broker (110). In this embodiment, the sub-topic is: /administrators/administrator 2/request/x.y.z. Also, the presentation component (130) stops its subscription to the sub-topics in Topics 1A associated with the remaining administrators, that is: /administrators/administrator_2/request/x.y.z.

Since a handshake process with an available administrator (i.e. Administrator 1) has been successful, (positive result to step 310), the process passes to step 325, wherein subscriptions by Administrator 1 and the presentation component (130) to the sub-topic in Topics 1A associated with the available administrator are maintained, that is: /administrators/administrator__1/request/x.y.z. This sub-topic is now used for all proceeding communications.

At step 330, the presentation component (130) sends more data associated with the error by publishing the data in a sixth message to the sub-topic associated with Administrator 1. Specifically, data from the program field, timestamp field and administrator ID field in the knowledge base (140) are retrieved. This data allows the Administrator 1 to determine whether or not the first program component should be used. For example, if the timestamp data denotes that the first program component was logged relevantly recently, this indicates that the first program component is relatively current and that it should be used. Furthermore, the administrator data denotes the administrators associated with the first program code component, thus providing Administrator 1 with data regarding other administrators that the may wish to contact. An example of the sixth message is shown below:

```
Message 6 to sub-topic "/administrators/administrator_1/request/x.y.z":
<problem-fixes>
    <fix> id="1";timestamp= "2003-11-28 15:49:23";
administratorID= "admin1@email.com.....admin2@instanLmessage.com..
and "ad min3@email.com..
<command sequence="1">http404.sh</command>
    </fix>
</problem-fixes>
```

Next, the presentation component (130) makes a determination (step 335) as to whether Administrator 1 wishes to use the first program code component. Specifically, the presentation component (130) waits for a response from Administrator 1. Administrator 1 publishes a seventh message to the sub-topic. A first example of the seventh message is shown below, wherein Administrator 1 does not wish to use the first program code component, but wishes to attempt to fix the error themselves. This causes the process to pass to step 355, which will be described later:

```
Message 7 to sub-topic "/administrators/administrator_1/request/x.y.z":
<response_3>
    <self-fix/>
</response_3>
```

A second example of the seventh message is shown below, wherein Administrator 1 wishes to use the first program code component:

```
Message 7 to sub-topic "/administrators/administrator_1/request/x.y.z":
<response_3>
    <use-fix id= >
</response_3>
```

Now, preferably, an authentication component executes a process for authenticating an administrator. In one example, the authentication component posts a message to the sub-topic requesting login details from Administrator 1. Administrator 1 sends login details via another message posted to the sub-topic. The authentication component, upon receiving the login details, accesses a stored list of login details in order to compare the received login details to the list. If authentication is not successful (that is, the received login details do not match the login details in the list), the process ends.

In response to a successful authentication (that is, wherein the received login details match the login details in the list), the search component (125) passes the first program code component to the execution component (135). The execution component (135) then connects to the first computer system (150) and executes (step 340) the first program code component on the first computer system (150). In one example, the first program code component performs a reboot of the computer system (135).

Preferably, the execution component (135) also subscribes to the sub-topic associated with Administrator 1, that is: /administrators/administrator_1/request/x.y.z. Preferably, the execution component (135) waits from an input from the first computer system (150), the input signalling that the first program code component has finished executing. Once an input is received, the execution component (135) publishes an eighth message to the sub-topic, indicating that the first program code component has finished executing. An example of the eighth message is shown below:

---

Message 8 to sub-topic "/administrators/administrator_1/request/x.y.z":
<response_4>
    <fix-complete id="1"/>
</response_4>

---

Next, in response to the notification, at step 345, the error detection component (120) determines whether the first program code component has been successful in fixing the error. In this embodiment, the thread of the error detection component (120) performs the et/request. Preferably, the error detection component (120) waits an arbitrary period of time for an expected response from the first computer system (150). If a response is received from the first computer system (150) (i.e. the index page returns successfully), this indicates that the first program code component has successfully fixed the error and the process ends.

If an expected response is not received from the first computer system (150) (e.g. error code 404 is received) from the first computer system (150), this indicates that the first program code component has not fixed the error. In one embodiment, the execution component (135) re-executes the first program code component. In another embodiment, the presentation component (130) can contact other administrators (i.e. Administrators n) subscribed with the broker (110), as will be described with reference to step 315. In this embodiment, the process passes to step 350, wherein the presentation component (130) publishes a ninth message to the sub-topic, the ninth message requesting whether Administrator 1 wishes to continue the process:

---

Message 9 to sub-topic "/administrators/administrator_1/request/x.y.z":
<response_5>
    <fix-not_complete id="1">
    <continue answer="N"or"Y"/>
</response_5>

---

Administrator 1 responds by publishing a tenth message to the sub-topic. In a first example of a tenth message, Administrator 1 does not want to continue the process and thus the process ends:

---

Message 10 to sub-topic "/administrators/administrator_1/request/x.y.z":
<response_6>
    <continue answer="N"/ >
</response_6>

---

In a second example of a tenth message, Administrator 1 wants to continue and the process passes to step 355:

---

Message 10 to sub-topic "/administrators/administrator_1/request/x.y.z":
<response_6>
    <continue answer="Y"/>
</response_6>

---

Step 355 denotes the start of a sub-process wherein an administrator attempts to fix an error themselves, that is, without using a stored program code component. Preferably, the authentication component authenticates an administrator, as described above. Next, at step 355, the execution component (135) is invoked and establishes a session (i.e. a connection) to the first computer system (150).

Since Administrator 1 and the execution component (135) have already subscribed to the sub-topic /administrators/administrator_1/request/x.y.z, the execution component (135) can receive commands from Administrator 1, wherein Administrator 1 publishes the commands in one or more messages to the sub-topic. At step 360, the execution component (135) sends the commands to the first computer system (150).

Also, Administrator 1 receives responses from the first computer system (150), wherein the responses are first sent by the first computer system (150) to the execution component (135). The execution component (135) then publishes the responses in one or more messages to the sub-topic. Preferably, commands received from Administrator 1 are stored (step 360) by the execution component (135) in a storage component (e.g. an array) as they are received, such that the stored commands create a second program code component.

Once Administrator 1 has finished sending commands, an eleventh message denoting the completion of command sending, is published to the topic:

---

Message 11 to sub-topic "/administrators/administrator_1/request/x.y.z":
<response_7>
    <self-fix=complete/>
</response_7>

---

The execution component (135) then closes the session. Next, in response to the eleventh message, at step 365, the error detection component (120) determines whether the second program code component has successfully fixed the error (i.e. whether the index page returns successfully). In response to a positive result, the second program code component is stored (step 370) in the knowledge base (140), advantageously augmenting the knowledge base (140). In response to a negative result, the process ends. Alternatively, in response to a negative result, in one embodiment, the execution component (135) re-executes the second program code component. In another embodiment, the presentation component (130) can contact other administrators (i.e. Administrators n) subscribed with the broker (110), as will be described with reference to step 315.

With reference back to step 310, if a successful handshake process does not occur, for example, because a request from the presentation component (130) is not accepted or if no administrators can be contacted (i.e. the status of all administrators is away), the process passes to step 315, wherein the presentation component (130) publishes a message to a topic, requesting help, to all administrators (i.e. administrators n) subscribed with the broker (110), that is, not only to the administrators logged in the knowledge base (140). The topic is shown below, wherein the wildcard (i.e. #) represents all administrators:

| Topic 2: |
| --- |
| /administrators/#/request/x.y.z |

A handshaking process as described above is executed and if it is determined at step 320 that it is successful, the process passes to step 325 as described above. If the handshaking process is not successful, the process ends.

With reference back to FIG. 2, at step 215, if an entry is not present (and therefore, this means that the error is not known or has not been fixed before and that no associated administrator details are stored in the knowledge base (140)) (negative result to step 215), the process passes to FIG. 4, which will now be described. At step 400, the presentation component (130) publishes a message to a topic (e.g. Topic 2), requesting help, to all administrators subscribed with the broker (110).

At step 405, if it is determined that a handshaking process is not successful, the process ends. If the handshaking process is successful (in this embodiment, a handshaking process with Administrator 2 is successful), the process continues to step 410, which denotes the start of the sub-process described above, wherein an administrator attempts to fix an error themselves, that is, without using a stored program code component. At step 410, the execution component (135) is invoked and establishes a session (i.e. a connection) to the first computer system (150).

The presentation component (130), the execution component (135) and Administrator 2 communicate via a sub-topic as described above (e.g. /administrators/administrator2/request/x.y.z). This allows the execution component (135) to receive commands from Administrator 2 and Administrator 2 to receive responses from the first computer system (150). At step 415, the execution component (135) sends the commands to the first computer system (150) and stores the commands in an array as they are received, such that the stored commands create a new program code component. Once Administrator 2 has finished sending commands, this is communicated to the sub-topic in a message.

The execution component (135) then closes the session. Next, at step 420, the error detection component (120) determines whether the new program code component has successfully fixed the error, (i.e. whether the index page returns successfully). In response to a positive result, the new program code component is stored (step 425) in the knowledge base (140). In response to a negative result, the process ends. Alternatively, in response to a negative result, in one embodiment, the execution component (135) re-executes the new program code component. In another embodiment, the presentation component (130) can again contact other administrators (i.e. Administrators n) subscribed with the broker (110).

What is claimed is:

1. A diagnostic system for use in an environment having a remote computer system, components of said diagnostic system being resident on one or more computer systems, said diagnostic system comprising:
    an error detection component for detecting errors associated with the remote computer system;
    a storage component for storing at least one computer program for performing at least one diagnostic in response to an error associated with the remote computer system;
    a search component, responsive to a first error being detected by said error detection component, for searching the storage component for a first computer program associated with the first error;
    a message broker, wherein an administrator subscribes with the message broker;
    a presentation component for presenting a first option to the administrator, wherein the first option is associated with selection of the first computer program; and
    an execution component, responsive to receiving a first input from the administrator associated with a selection of the first computer program, for executing the first computer program on the remote computer system.

2. The system of claim 1, wherein the administrator is a creator of the first computer program.

3. The system of claim 1, wherein the storage component stores computer program data associated with the at least one computer program; error data associated with the errors; and status data associated with availability of the administrator.

4. The system of claim 3, wherein the error data comprises an identifier associated with the first error.

5. The system of claim 3, further comprising a checking component for checking the status data in order to determine whether the administrator is available.

6. The system of claim 5, wherein, in response to the checking component determining that the administrator is available, the presentation component presents the error data to the administrator and an option for the administrator to execute the first computer program associated with the first error.

7. The system of claim 1, wherein the presentation component presents the first option to execute the first program associated with the first error to a plurality of administrators authorized to execute the first computer program.

8. The system of claim 7, further comprising a selection component, responsive to a plurality of inputs from the plurality of administrators, for discriminating between the plurality of inputs to select the first input.

9. The system of claim 1, further comprising an authentication component for authenticating the administrator before the execution component executes the first computer program.

10. The system of claim 1, wherein the error detection component determines whether the first computer program has successfully performed diagnostics on the first error.

11. The system of claim 10, wherein, in response to the first computer program unsuccessfully performing diagnostics on the first error, the execution component re-executes the first computer program.

12. The system of claim 10, wherein, in response to the first computer program unsuccessfully performing diagnostics on the first error, the presentation component presents the first option to a plurality of administrators.

13. The system of claim 1, wherein, in response to being unsuccessful in identifying an available administrator, the presentation component makes a request for help to all subscribed administrators.

14. The system of claim 1, wherein, in response to a second input associated with a de-selection of the first computer program, the presentation component presents a second option to the administrator, wherein the second option allows the administrator to input commands to the remote computer system.

15. The system of claim 14, wherein the input commands, upon being executed to successfully resolve the first error, are associated with the first error and stored as a new program code component in the storage component.

16. A method for use in an environment having a remote computer system and an error detection component for detecting errors associated with the remote computer system, said method comprising:
- storing at least one computer program for performing at least one diagnostic corresponding to an error associated with the remote computer system;
- in response to a first error being detected, searching the storage component for a first computer program associated with the first error;
- determining administrators that are currently online from among a group of administrators with the responsibility of administering said remote system;
- presenting an option to at least one online administrator to execute the first computer program; and
- in response to receiving an affirmative input from the administrator response to the option, executing the first computer program on the remote computer system.

17. The method of claim 16, further comprising making a request for help to all subscribed administrators with the presentation component if there is no available administrator online.

18. The method of claim 16, wherein a new series of commands entered by the administrator, upon being executed to successfully resolve an error in the remote system, are associated with the first error and stored as a new program code component in the storage component.

19. A computer program product for use in an environment having a remote computer system and an error detection component for detecting errors associated with the remote computer system, the computer program product comprising a computer readable storage having computer readable program code tangibly embedded therein, the computer readable program code comprising:
- computer readable program code configured to store at least one computer program for performing diagnostics on errors associated with the remote computer system;
- computer readable program code configured to search, in response to a first error being detected, a storage component for a first computer program associated with the first error;
- computer readable program code configured to present a first option to an administrator, wherein the first option is associated with selection of the first computer program;
- computer readable program code configured to execute, in response to receiving a first input from the administrator associated with a selection of the first computer program, the first computer program on the remote computer system, and
- computer readable program code configured to present, in response to a second input associated with a de-selection of the first computer program, a second option to the administrator, wherein the second option comprises a prompt for the administrator to enter a command to be transmitted to the remote computer system, wherein the entered command upon being executed to successfully resolve the first error is associated with the first error and stored as a new program code component in the storage component.

\* \* \* \* \*